United States Patent [19]

McLellan

[11] Patent Number: 4,468,776
[45] Date of Patent: Aug. 28, 1984

[54] REINJECTION LASER OSCILLATOR AND METHOD

[75] Inventor: Edward J. McLellan, Los Alamos, N. Mex.

[73] Assignee: The United States of America as represented by the United States Department of Energy, Washington, D.C.

[21] Appl. No.: 294,601

[22] Filed: Aug. 20, 1981

[51] Int. Cl.³ .............................................. H01S 3/081
[52] U.S. Cl. ...................................... 372/93; 372/700; 372/103; 372/70; 372/12; 372/18; 372/55; 372/99
[58] Field of Search ....................... 372/10, 12, 18, 19, 372/93, 107, 69, 70, 25, 700

[56] References Cited

U.S. PATENT DOCUMENTS

| | | | |
|---|---|---|---|
| 3,597,695 | 8/1971 | Swain et al. | 330/4.3 |
| 3,622,907 | 11/1971 | Tomlinson et al. | 330/4.3 |
| 3,646,468 | 2/1972 | Buczek et al. | 330/4.3 |
| 3,902,130 | 8/1975 | Pike | 330/4.3 |

OTHER PUBLICATIONS

"A High Power Short Pulse $CO_2$ TEA Amplifier" Czuchlewski et al., Proceed. of Int. Conf. on Lasers, 1978; Orlando, Florida; Dec. 11-15, '78.
"A High Pressure Reinjection $CO_2$ Oscillator" McLellan et al., Proc. of SPIE, 1980, Wash., D.C., May 10-11, 1980.
McLellan et al., "High Pressure Reinjection $CO_2$ Oscillator", SPIE vol. 227, $CO_2$ Laser Devices and Applications, Apr. 10-11, 1980.

Primary Examiner—William L. Sikes
Assistant Examiner—Léon Scott, Jr.
Attorney, Agent, or Firm—Samuel M. Freund; Paul D. Gaetjens; Michael F. Esposito

[57] ABSTRACT

A uv preionized $CO_2$ oscillator with integral four-pass amplifier capable of providing 1 to 5 GW laser pulses with pulse widths from 0.1 to 0.5 ns full width at half-maximum (FWHM) is described. The apparatus is operated at any pressure from 1 atm to 10 atm without the necessity of complex high voltage electronics. The reinjection technique employed gives rise to a compact, efficient system that is particularly immune to alignment instabilities with a minimal amount of hardware and complexity.

11 Claims, 3 Drawing Figures

REINJECTION LASER OSCILLATOR AND METHOD

BACKGROUND OF THE INVENTION

The apparatus of the present invention relates generally to lasers and more particularly to reinjection laser oscillators where part of the laser gain volume is used as an oscillator and the remainder as an amplifier. This invention is the result of a contract with the Department of Energy (Contract No. W-7405-ENG-36).

Reliable, high-power high contrast subnanosecond laser pulses are necessary for studies of laser-induced fusion, laser isotope separation and time domain spectroscopy, among others. A standard approach for obtaining gigawatt laser pulses with pulse widths of about 1 ns is to begin with an oscillator and an electro-optical device to generate the desired wavelength and pulse width, respectively, most usually at low power. These pulses are then sent through a series of spatial filters, isolators, saturable absorbers and amplifiers to obtain the desired power. Several lasers of increasing complexity and a long optical path length are required, thereby introducing optical alignment and long-term stability problems. Moreover, since cost, failure rate, maintenance and system complexity all increase as the number of components increases, this route to achieving high power laser pulses is undesirable.

High-pressure oscillators produce multiline laser pulses which can be amplified more efficiently. Such lasers are also more efficient as short-pulse amplifiers. This has the result that fewer lasers, isolators, etc. are required to reach a given power. However, conventional high-pressure lasers having apertures large enough to produce gigawatt pulses without damage to the windows require very high voltage Marx bank generators to pump the laser discharge, thereby increasing the complexity of each laser used. Multipass optical systems are also used to send the laser pulse back through the same amplifier several times to improve energy extraction efficiency and further decrease the number of components required. The disadvantages of multipass systems are that they degrade pulse-to-background contrast ratio and that they can be difficult to stabilize against parasitic oscillators.

Finally, the simple scaling of oscillators to produce the requisite output power is very inefficient because the energy density which must be maintained within the laser cavity is a factor of ten to one hundred greater than that which can be extracted, and oscillators have inherent heating and coupling losses particularly at the output coupling devices.

A reinjection oscillator is a laser which uses part of its gain volume as an oscillator and the remainder as an amplifier. The apparatus of the instant invention is a reinjection oscillator which operates at high pressures to generate multiline gain-switched laser pulses which are passed through an ultrafast Pockels cell system which selects certain subnanosecond pulses which comprise the longer gain-switched pulse. The selected subnanosecond pulses are reinjected into the same gain medium from which these pulses originated and caused to make four amplifying passes before exiting the gain medium. The amplification path is essentially parallel to but displaced from the oscillator light path. That is, the reinjected pulses do not follow the same optical pathway that they followed when they were first formed. A single spark gap and capacitor are used for the main discharge to eliminate the electrical complexity normally associated with high-pressure systems. Apertures are placed at several locations in the four-pass amplification optical path in order to spatially filter the beam as it propagates and to completely eliminate parasitic oscillations without the need for isolators or saturable absorbers. The entire reinjection oscillator, which, in a preferred embodiment is a $CO_2$ laser, including all four-pass amplifier optics apertures and all discharge electronics except power supplies, is integrated into a simple $1 \times 1 \times 6$ ft.$^3$ invar-stabilized space frame. Thereby, the number of components and optical pathlengths required to generate gigawatt $CO_2$ laser pulses is minimized which reduces system cost, maintenance and failure rate.

It has been known for many years that $CO_2$ lasers could be operated at lower voltages by increasing the concentration of helium in the gas mixture. However, no systematic study has been done elucidating the relationship between the helium partial pressure and the glow discharge or equilibrium voltage of a discharging $CO_2$ gas mixture (usually comprising $CO_2$, $N_2$, and He). The method of the instant invention describes a quantitative relationship which permits the selection of the appropriate helium partial pressure such that a $CO_2$ gas discharge can be operated at high gain, without arcing and without the necessity of complex high voltage Marx bank electronics between 1 and 10 atm.

In summary, then, the apparatus of the instant invention provides subnanosecond duration gigawatt $CO_2$ laser pulses using a single gain volume without the necessity of using complex and costly Marx bank high voltage (hundreds of kilovolts) generation, without parasitic oscillations, without optical alignment long term stability problems, without the use of isolators and saturable absorbers, and without severe output coupler damage problems. The system cost, maintenance and failure rate is significantly reduced from those resulting from standard approaches to generation of similiar laser pulses. The apparatus of the instant invention is applicable to wavelength regions other than that for the $CO_2$ laser emissions.

Multipass laser amplifiers are well known in the art. For example, U.S. Pat. No. 3,902,130 issued to Pike discloses an apparatus for lengthening laser output pulse duration as well as for amplification of narrow bandwidth pulses without spectral broadening. A laser amplifier is configured to provide multiple traversal of each laser input pulse through this amplifier while allowing a portion of each amplified output pulse to be reinjected into the amplifier for generation of a sequence of pulses, thereby lengthening the duration of the laser output. Although Pike's patent teaches both amplification by multiple traversal and reinjection, it teaches away from the apparatus of the instant invention since in the former apparatus the original source of the laser oscillation is a separate laser device, and the purpose of the reinjection is to lengthen the overall laser pulse duration and not to amplify the oscillator output which has already been amplified at the point of partial reinjection. Further, in the apparatus of the instant invention, the gain medium is operated as a heavily saturated amplifier giving the dual advantage of high reproducibility and temperal pulse compression. That is, the particular reinjection scheme involving electro-optically-modified pulses taught by our invention is intended to narrow rather than lengthen the duration of the laser output. In fact, it is shown that the temporal response of the output from the apparatus of the instant invention is significantly narrower than the mode-locked pulses which are generated by the oscillator and simply amplified in the four-pass amplifier without the use of the Pockels cell switch.

U.S. Pat. No. 3,597,695 issued to Swain et al. teaches a single laser pulse amplifier where pulses are switched in and out of the amplifier by means of electro-optic switches. A finite, predetermined number of passes are made by the oscillator radiation in the amplifying medium. However, again as in Pike, supra, the amplifier and oscillator are separate units.

U.S. Pat. No. 3,646,468 issued to Buczek et al., teaches injection of low power, stable laser oscillator output into a second, more powerful oscillator for purposes of stabilization of the latter oscillator, and does not teach the instant invention, which is an oscillator/amplifier apparatus.

U.S. Pat. No. 3,622,907 issued to Tomlinson, teaches a composite oscillator/amplifier laser wherein the same laser gain medium supports both oscillation and amplification. This device can be distinguished from the apparatus of the instant invention in two ways. First, Tomlinson does not teach the use of apertures to eliminate self-oscillations in the amplifier region. The instant invention teaches apertures which effectively isolate the oscillator from the amplifier, and vice versa, and which further act as a continuous spatial filter when the Fresnel pattern of each aperture is centered on the aperture following it. The stability of the instant optical path configuration which uses apertures as isolators has been verified experimentally and represents a significant contribution to this type of laser technology. Further, as mentioned above, simple reinjection of oscillator pulses into the amplifier region may not produce temporal pulse compression even if the gain medium is heavily saturated unless such pulses are electro-optically or otherwise generated with suitable temporal lineshapes. That is, the oscillator pulses must be shaped before they are reinjected into the amplifier in order to provide subnanosecond pulses as is taught by the present invention.

A brief description of the apparatus of the instant invention was published by S. J. Czuchlewski et al., in the Proceedings of the International Conference on Lasers, 1978, Orlando, Fla. Dec. 11–15, 1978. The paper entitled "A High Power (~10 GW) Short-Pulse ($\leq 1$ ns) $CO_2$ TEA Amplifier," mentions the precursor to the instant design. In particular, it includes a different amplifier geometry; one requiring much smaller apertures to avoid oscillator/amplifier interaction. However, the description furnished is not enabling with respect to the apparatus of the instant invention, and is not enabling with respect to the reinjection oscillator mentioned therein. The reinjection oscillator is used to furnish appropriate pulses for the power amplifier which is the subject of the paper, and only the emitted pulses are described with particularity. It should be noted that the apparatus of the instant invention can be operated with or without the smoothing tube shown in the above reference. Further, the instant invention, because of its improved amplifier geometry provides much more efficient energy extraction; it can operate with much larger apertures and still maintain its freedom from self-oscillation.

Finally, a more complete description of the scientific background of the method and apparatus of the instant invention can be found in "A High Pressure Reinjection $CO_2$ Oscillator," by E. J. McLellan et al., Proceedings of SPIE, 1980, Washington, D.C., May 10–11, 1980.

SUMMARY OF THE INVENTION

A primary object of the apparatus of the instant invention is to provide a gigawatt, subnanosecond laser pulses from a single oscillator/amplifier unit.

A second object of our invention is to improve optical alignment and long term stability of such lasers.

Another object is to decrease the number of required components thereby, reducing cost, failure rate, maintenance and system complexity.

Yet another object is to improve pulse-to-background contrast ratio and stability against parasitic oscillations common to multipass systems without isolators or saturable absorbers.

Another object is to reduce the high voltage requirement common to lasers which can produce gigawatt pulses without damage to windows; that is, conventional high pressure lasers with large apertures require complex Marx bank high voltage generators.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus of this invention may comprise an optical gain medium which generates gain-switched laser pulses which are passed through an ultrafast electro-optic system which chops subnanosecond pulses from the longer gain-switched pulse. The subnanosecond pulses are then reinjected into the same gain medium at a position displaced from the oscillation pathway and in a direction approximately parallel to it. Preferably, four amplifying passes are made before the pulses exit the laser. In order to prevent self-oscillation in the amplifier region, care must be taken to avoid any parallel reflector faces. Preferably, this is accomplished by using a folded mirror configuration which allows a very compact amplification volume to be achieved without resort to severely restricting the dimensions of the amplified laser beams. It is also preferred that there be two approximately parallel, but oppositely directed, laser paths through the region of amplification with a crossover region in between them. Preferably also, a Q-switch can be placed in the oscillator cavity to delay the commencement of oscillation until peak gain is reached throughout the entire gain medium. In addition, a smoothing device may be inserted in the oscillator cavity to achieve reproducible pulse charactristics. It should be noted, however, that the apparatus of the instant invention can operate without a smoothing tube although pulse uniformity will be sacrificed. Means for defining the oscillation and amplification pathways such that parasitic oscillations due to broadening of the laser beam are eliminated are preferably provided. It is also preferred that apertures be used for this spatial filtering function instead of isolators or saturable absorbers. Preferably, the gain medium is operated in a heavily saturated mode to provide high reproducibility and to temporally compress the pulse. Said gain medium is operated at any pressure from 1 atm to 10 atm with uv preionized $CO_2$ gas mixtures.

It is also preferred that a single spark gap and capacitor be used for the main discharge providing the molecular population inversion in the optical gain medium. This eliminates the electrical complexity normally associated with high pressure systems such as high voltage Marx bank generators.

Moreover, preferably, the entire reinjection oscillator including all four-pass amplifier optics, apertures and all discharge electronics except power supplies are integrated into a single invar-stabilized space frame. Thereby, the number of components and optical path lengths required to generate gigawatt $CO_2$ laser pulses are minimized, which reduces system cost, maintenance and failure rate.

In a further aspect of the present invention, in accordance with its objects and purposes, the method hereof selecting a convenient operating voltage for the gain tube, may comprise the steps of adjusting the $CO_2$ gas mixture such that the gain medium operates reproducibly and without arcing at 1 atm total pressure, and then varying the helium concentration (partial pressure) according to the realtionship $PR^{\frac{3}{2}}=$ Constant while increasing the pressure to 10 atm. Operating at higher pressures significantly increases the energy per pulse. Normally, a much higher voltage is required to discharge a 10 atm pressure gain medium than a 1 atm one. By following this algorithm, the gain medium will operate reproducibly without arcing at the same voltage as it operated at 1 atm, thereby avoiding complex and costly Marx generators while still providing high efficiency short pulse amplification. That is, the combination of reinjection amplification with high pressure operation made possible at lower voltages by properly adjusting the helium concentration allows subnanosecond, gigawatt pulses to be generated from a rather simple apparatus.

The reinjection laser oscillator of the instant invention provides an apparatus for generating subnanosecond gigawatt laser pulses. Its advantages over existing art include decreased complexity and shorter optical pathlength which reduces optical alignment problems and increases long-term stability. Parasitic oscillations and poor pulse-to-background contrast ratios characteristic of multipass laser amplifiers are eliminated by the use of apertures. The apertures can be operated with substantial openings, thereby improving the energy extraction efficiency. This is due principally to the amplifier geometry which in addition to being spatially compact, eliminates the need for isolators and saturable absorbers. Further, complex Marx bank high voltage generators ordinarily required to produce the discharge for high pressure lasers with apertures large enough to produce gigawatt pulses without damage to the windows can be replaced by a single spark gap and capacitor in the apparatus of the instant invention by utilizing the method of the instant invention. Finally, use of an integrated design where the entire reinjection oscillator including all four-pass amplifier optics, apertures and all discharge electronics except power supplies are supported by a single invar-stabilized space frame, reduces the number of components and minimizes optical pathlengths required to generate gigawatt laser pulses which in turn reduces system cost, maintenance and failure rate.

DETAILED DESCRIPTION OF THE INVENTION

Reference will now be made in detail to the present preferred embodiment of the invention, an example of which is illustrated in the accompanying drawings.

Figure 1:
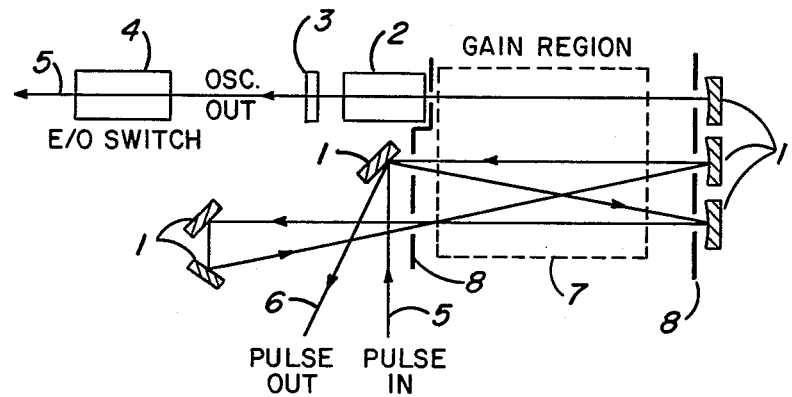
FIG. 1 shows a schematic of the reinjection oscillator of the instant invention.

FIG. 1 shows the mirror configuration 1 for the reinjection oscillator/amplifier of the apparatus of the instant invention. The gain region 7 simultaneously supports laser oscillation and four-pass amplification. In a preferred embodiment, the gain medium is a $CO_2$ gas mixture ($CO_2$, $N_2$, and He) in concentrations to be described below, at pressures between 1 and 10 atm. However, the apparatus will work for other gain media. Different volumes, within the discharge are used for the oscillator and amplifier paths.

A three-stage electro-optical switch 4 is used to chop a short pulse (i.e., 0.1 to 1 ns) from the 40 ns single longitudinal mode oscillator pulse 5. Preferably, the switch comprises a laser-triggered spark gap driving a series (3) of Pockels cells.

In one embodiment of the apparatus of the instant invention, an intracavity low pressure $CO_2$ longitudinal discharge smoothing tube 2 was inserted outside of the $CO_2$ gain medium between the output coupler 3 and the mirror (uppermost mirror 1) defining the oscillator. This improves the pulse-to-pulse uniformity of the instant device, but is unnecessary for its overall operation. That is, the reinjection oscillator will operate, albeit with much poorer reproducibility, without the smoothing tube. Similarly, a Q-switch can be inserted for optimal performance in the oscillator cavity to delay the oscillator pulse until the peak gain of 4.5/m (3 atm) is reached. However, without the use of a Q-switch to optimize performance, the instant laser has produced 700 mJ, 1 ns full-width-at-half-maximum (FWHM) $CO_2$ laser pulses. The Q-switch is not shown in FIG. 1, but it could be located at uppermost mirror 1, if mechanical Q-switching employed, or between uppermost mirror 1 and the output coupler 3 (outside of the gain medium 7) if electrooptical gain switching is used.

The short pulse is then reinjected into the gain medium along a path parallel to but displaced from the oscillator optical path for four passes where it is amplified by the 2.4 m pathlength within the gain volume of the instant apparatus, and emerges as an output pulse 6.

The center of the oscillator beam is chosen to be the upper portion of the discharge volume in FIG. 1, leaving most of the gain region for pulse reinjection. The lower, reinjection region, because of the beam crossover, operates as a heavily saturated amplifier giving rise to the dual advantage of high reproducibility and temporal pulse compression. Although mode-locked pulses can be generated by the oscillator and amplified in the amplifier directly, they generally do not show the temporal pulse compression of electro-opticallygenerated pulses. Gain isolation is not required in the four-pass amplifier section to prevent self-oscillations even for a small-signal gain of 4.5/m which gives a total gain in the amplifier of $5 \times 10^4$. This is essentially due to the mirror configuration 1 and aperture placement 8 which effectively prevents retroreflections of any oscillations spontaneously generated within the amplifier. Apertures 8 are placed at each end of the laser to define the oscillator and amplifier optical paths and to completely eliminate self oscillations in the amplifier region. In addition to adequately isolating the system, the apertures also act as a continuous spatial filter when the Fresnel pattern of each aperture is centered on the aperture following it.

The main discharge current is supplied by a single capacitor (0.075 $\mu f$) charged to 75 kV and a spark gap switch. The capacitor, spark gap and necessary bias resistors are potted into a single low-inductance module and mounted inside a high-pressure tube just below a Rogowski profile cathode. Preionization is supplied by two rows of sparks, each containing 40 sparks. This flashboard is located 1 cm behind a flat anode screen which has 40% open area. Current is supplied to the flashboard by ceramic capacitors (0.014 $\mu f$ total) charged to 25 kV and a smaller spark gap switch. The capacitors, spark gap, bias resistors and trigger coupling networks for both gaps are potted into a single module and mounted inside the high pressure tube next to the main discharge electronics module below the Rogowski profile cathode. Two trigger transformers are also mounted inside the pressure enclosure so that the only high voltage connections which must withstand the high-pressure are the two power supply cables for the main discharge and the preionizer capacitors. The main electrodes are separated by 1.5 cm and produce a 60-cm long discharge with a 4.5 cm wide uniform ($\pm 8\%$) gain. When the main capacitor is at 75 kV the effective stored energy density is (420/P)J/1-atm, for the $\frac{1}{2}$-1 discharge volume. All of the optical components required for the oscillator and four-pass amplifier configuration shown in FIG. 1 are mounted on A1 plates which clamp to three invar bars. The first plate is clamped to an optical table and the remaining plates rest on roller bearing slides so that expansion differences between the table and invar bars do not cause alignment instabilities. This design results in a compact well-integrated system which minimizes optical pathlength and maximizes optical stability. The mirror mounts are spring-loaded to the A1 plates with a ball and socket, radial-end micrometer and plane, and radial-end micrometer and groove as the three-point contacts. A three point contact is issued between the mirror and the mount to prevent distortion of the mirrors when they are clamped and to prevent misalignment due to the vibration caused by the laser discharge. Locking micrometers are used to insure the long-term alignment stability of the system in this vibrating environment.

Figure 2:
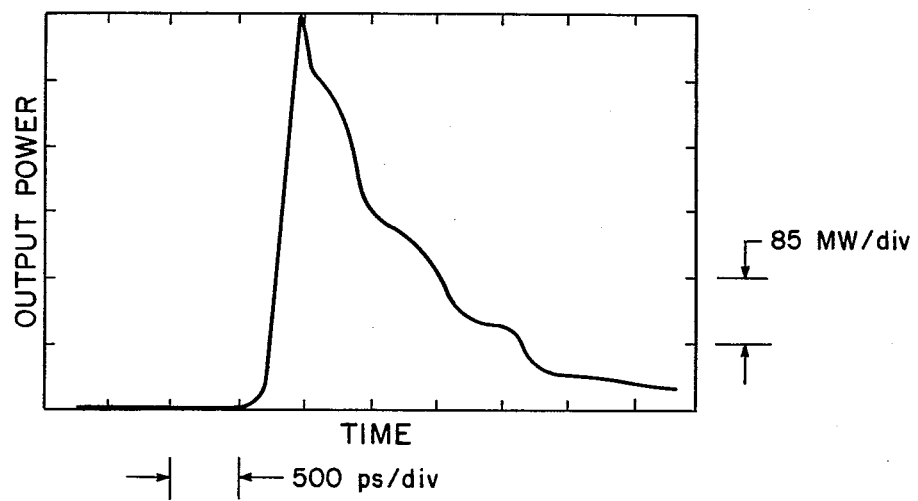
FIG. 2 shows the single-pass output of the oscillator (typically 1 to 10 MW) after having been amplified by the four-pass amplifier section.

FIG. 2 shows the typical 1 to 10 MW single-pass output of the oscillator after passing through the four-pass amplifier. The reinjection scheme of the instant invention amplifies single-pass oscillator outputs to discharged $\frac{1}{2}$ gigawatt when the gain medium is operated at 1 atm. The system is capable of substantially higher outputs (1-5 GW) at higher pressures as will be discussed below. Precise subnanosecond pulse-shaping capability and high pulse-to-background energy contrast ratio are additional characteristics of my invention. Finally, reproducibility and controllability extend to the early and late portions of the pulse during which the intensity is more than seven orders of magnitude less than the peak intensity.

The method of the instant invention includes a procedure whereby the instant apparatus can be operated at up to 10 atm total pressure while maintaining the *same* voltage as is required for 1 atm operation. As previously mentioned, this completely avoids the necessity of high voltage Marx generators to generate the laser discharge (hundreds of kilovolts) which usually accompany high-pressure oscillators and amplifiers. High-pressure amplifiers are much more efficient for amplifying short pulses, and high-pressure oscillators produce multiline laser pulses which can be amplified more efficiently. Therefore, high-pressure operation of the instant reinjection laser further adds to the advantages of the apparatus.

To comprehend the use of the algorithm $PR^{\frac{1}{2}}$=Constant for the selection of the helium partial pressure, some background is necessary. When a $CO_2$ laser is operated with a self-sustained glow discharge the volume must first be preionized so that free electrons exist in the gas. A voltage $V_a$ is then applied to the electrodes resulting in acceleration of the electrons which undergo inelastic collisions which pump the laser gas and ionize it. Free electrons are continually being generated in the gas but electrons are also continually absorbed due to attachment to $CO_2$ molecules. The result is that after a time T, the voltage across the electrodes will reach a quasi-equilibrium condition at the self-sustained glow discharge voltage $V_s$. At that time, the ionization and attachment processes in the laser gas are in equilibrium and the gas will behave as a voltage regulator with the voltage between the electrodes remaining at $V_s$ independent of current as long as the current density is not too high (i.e., <100 amp/cm²-atm). A separate physical process which generates local nonuniformities in the electric field having substantial ionization results in arc formation. Once an arc is formed, the self-sustained glow discharge process is terminated and no further pumping of the laser gas is possible. If the arc occurs later in the discharge, the laser intensity will be reduced and the laser output power will vary from shot to shot. If the arc occurs early in the discharge, or before the self-sustained glow discharge can be established, the gas will not lase. Self-sustained glow discharge conditions do not eliminate the physical process responsible for the arcing, but they do slow the process down. It is therefore critical that the formative lag time T be minimized for arc-free laser operation.

Calculation of T and $V_s$ requires solving the Boltzmann transport equation using numerical cross-section data to determine the electron energy distribution function. This function can then be used to obtain the ionization and attachment coefficients and the electron drift velocity. Although the physical processes and resulting caclulations are extremely complex, a simple expression can be used to approximate their characteristics. At room temperature the following two equations can be used to predict $V_s$ and T for $CO_2$ lasers using conventional $CO_2$:$N_2$:He gas mixtures $$V_s = 20 \, DPR^{\frac{1}{2}} \qquad (1)$$

$$T = (0.2/PR^{\frac{1}{2}}) \exp([10.5 \, V_s/V_a]) \, (ns) \qquad (2)$$

where
$V_s$=self-sustained discharge voltage (kV)
D=electrode separation (cm)

P = laser gas pressure (atm)
R = ratio of non-He gas partial pressure to total gas pressure
T = formative lag time (ns)
$V_a$ = voltage applied to the electrodes by the main discharge circuits (kV).

Figure 3:
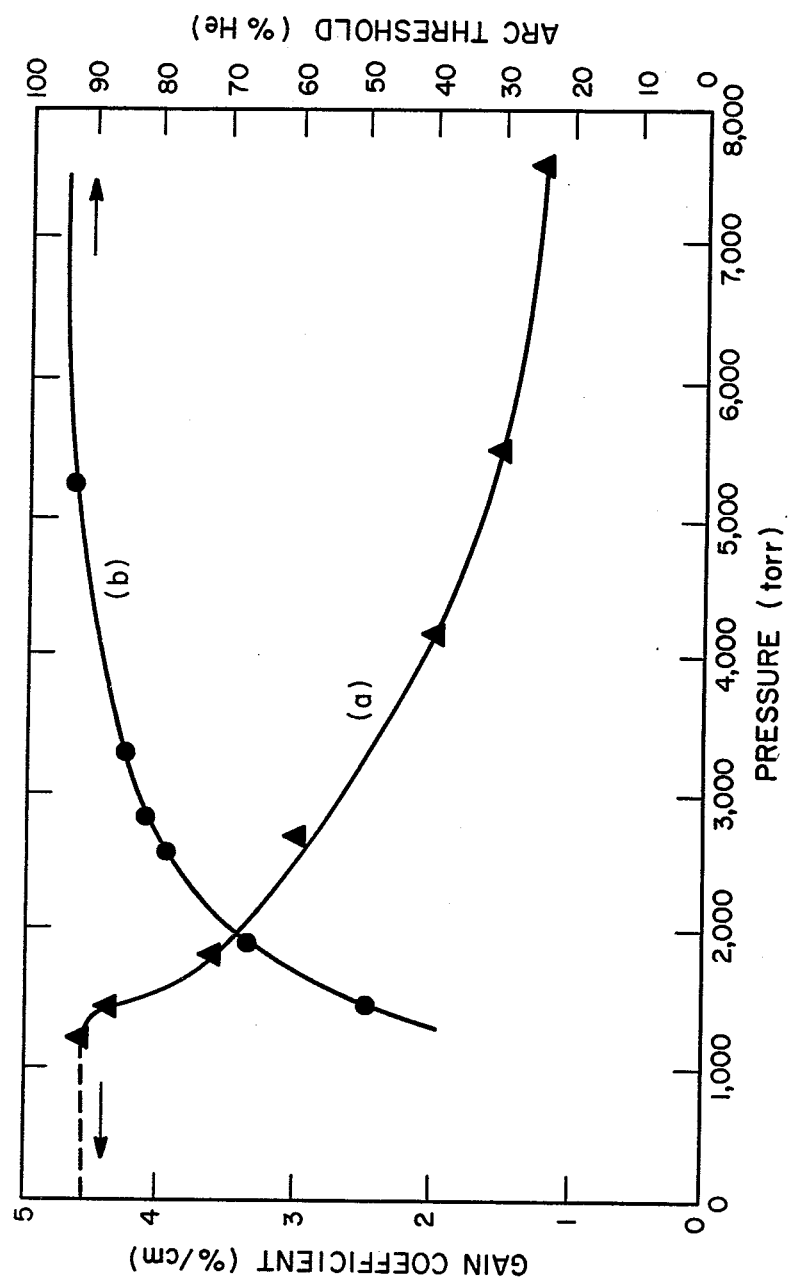
FIG. 3 is a plot of the gain and arc threshold showing that the dependence of arc threshold on pressure is a $PR^{\frac{3}{2}}$ function, and showing gain fall-off as a function of increasing pressure when the input electrical energy is held constant at 150 joules for the $\frac{1}{2}$-l discharge volume.

For a given electrode geometry and main discharge capacitor voltage, both $V_s$ and T depend only on $PR^{3/2}$. This suggests that a high pressure $CO_2$ laser can be built in a similar manner to a one atmosphere laser using a single spark gap and capacitor if, as the pressure is increased, the percent of He in the mix is increased so that $PR^{3/2}$ remains constant. The present reinjection oscillator has been operated at about 10 atm pressure with 96% He resulting in 1.25/m small-signal gain using the single-gap-single-capacitor design. It is operated with a fixed voltage, capacitance and $V_s$ independent of pressure. This means that the energy deposited in the gas is constant and that $PR^{3/2}$ and T are constant. As the pressure is increased with $PR^{3/2}$ = Constant, the laser linewidth increased and the number (i.e., partial pressures) of $CO_2$ and $N_2$ molecules decreases by a few percent in the discharge volume. The small-signal gain is exponentially dependent on the population inversion, which remains constant as P increases, divided by the linewidth, which increases as P increases. For gas pressures about 3 atm, adjacent gain lines overlap and the small-signal gain of any one line is higher than would be expected from simple theory. The result of these effects as P increases is that the small-signal gain drops exponentially until P reaches ~3 atm and continues to drop less rapidly until P reaches ~10 atm where the gain-drop with pressure is insignificant. FIG. 3 (curve (a)) shows gain versus pressure measured for this laser with $PR^{3/2}$ = 1.19 and $V_a$ = 63 kV.

The relationship between arc formation, pressure and gas composition was measured and the results are plotted in FIG. 3 (curve (b)). The input electrical energy was held constant at 150 joules for the ½-1 discharge volume. To obtain this data, the gas mixture and voltage (63 kv) were held fixed for each data run. The laser was operated at three pulses per minute (PPM) and the pressure was slowly increased while the discharge volume was observed. As the pressure increased, small arcs would eventually form on the electrodes which arcs would grow in size as the pressure was increased further. When one of the arcs grew long enough to just bridge the electrodes, it would have a small (i.e., ~5%) effect on the output energy of the laser. The pressure at which the arc just bridged the electrodes was defined as the arc pressure for that gas mix. An average value of $PR^{3/2}$ = 1.22 was obtained from this data with $PR^{3/2}$ = 1.19 and $PR^{3/2}$ = 1.27 as the minimum and maximum values, respectively. Using equations 1 and 2, this gives an average value of $V_s$ = 37 kV and T = 78 ns at the arc threshold. Therefore, by operating the laser at $PR^{3/2}$ = Constant away from this threshold, stable operation will be obtained over the pressure range from 1 to 10 atm.

In conclusion, the apparatus and method of the instant invention provides a reinjection oscillator which can be operated from 1 to 10 atm as an oscillator and as its own four-pass amplifier. Once a value of the helium partial pressure is established, for example at 1 atm total pressure, which yields stable and reproducible operation, by increasing the He concentration according to $PR^{3/2}$ = Constant, the laser will continue to operate stably at the same applied voltage up to approximately 10 atm. The present invention thereby eliminates the high-voltage requirements characteristic of 10 atm lasers. Additionally, the reinjection design provides in one oscillator/amplifier assembly what traditionally required one oscillator and one or more amplifiers, each with its own gain medium, optics and electronics. This simplification is made possible by the discovery that simple apertures accompanying a novel mirror-configuration provides the requisite isolation to avoid parasitic oscillations.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high intensity, subnanosecond pulse duration reinjection laser comprising in combination:
   a. means for producing a large area cross-section optical gain volume;
   b. means for generating a beam of pulsed laser oscillation in said optical gain volume;
   c. means for selectively switching a short temporal segment out of said beam of pulsed laser oscillation in said optical gain volume;
   d. means for reinjecting said selectively switched temporal segment into said optical gain volume to but displaced from the path of;
   e. means for multiply reflecting said reinjected temporal segment of said pulsed laser oscillation through said optical gain volume a selected number of times along a compact path disposed approximately parallel to and displaced from the path of said beam of laser oscillation, thereby achieving amplification of said reinjected pulsed laser oscillation, said means for multiply reflecting said reinjected pulsed laser oscillation having all reflecting surfaces substantially non-parallel; and
   f. means for extracting said amplified pulsed laser oscillation from said optical gain volume.

2. The reinjection laser as described in claim 1, wherein means are provided for defining said path of said beam of pulsed laser oscillation and said compact path of said multiply reflected reinjected pulsed laser oscillation, said path defining means including a series of apertures, whereby parasitic oscillations in the region of amplification of said pulsed laser oscillation arising from broadening of said beam of pulsed laser oscillation are eliminated.

3. The reinjection laser as described in claim 2, wherein said means for selectively switching said short temporal segment out of said beam of pulsed laser oscillation includes an electro-optical switch.

4. The reinjection laser as described in claim 3, wherein means are provided for delaying the generation of said pulsed laser oscillation until peak gain is reached in said optical gain volume.

5. The reinjection laser as described in claim 4, wherein means are provided for smoothing said pulsed laser oscillation.

6. The reinjection laser as described in claim 5, wherein said means for producing a large area cross-section optical gain volume includes a high pressure $CO_2$ gain tube, and wherein said means for smoothing said pulsed laser oscillation includes an intracavity low pressure $CO_2$ gain tube.

7. The reinjection laser as described in claim 6, wherein said means for producing a large area cross-section optical gain volume includes means for operating said optical gain volume in a heavily saturated mode.

8. The reinjection laser as described in claim 5, wherein said means for multiply reflecting said reinjected pulses through said optical gain volume provides for four passes through said optical gain volume, there being two spaced apart, essentially parallel traverses of said reinjected pulses in opposite directions with a point of intersection in between said parallel traverses, and wherein said means for multiply reflecting said reinjected pulses through said optical gain volume includes at least one folded configuration of reflectors, whereby a minimum of volume is required within said optical gain volume to achieve said amplification of said reinjected pulsed laser oscillation, and whereby a minimum of said beam of pulsed laser oscillation is cut off by said path defining means.

9. The reinjection laser as described in claim 8, wherein said reinjection laser is integrated into a single invar-stabilized space frame.

10. The reinjection laser as described in claim 3, wherein said electro-optical switch includes a three-stage series of Pockels cells driven by a laser-triggered spark gap.

11. A method for generating high intensity, subnanosecond pulse duration laser pulses which method comprises the steps of:
  a. determining helium partial pressure for stable, arc-free, reproducible laser operation of a high pressure $CO_2$ gain medium at a chosen applied voltage below about 75 kV at approximately 1 atm total gas pressure; and
  b. varying said helium partial pressure according to the relationship $PR^{\frac{3}{2}}$=Constant to determine the magnitude of said helium partial pressure for stable, arc-free, and reproducible operation of said $CO_2$ gain medium at pressures between about 1 atm and 10 atm at said chosen applied voltage.

* * * * *